Patented July 11, 1933

1,917,424

UNITED STATES PATENT OFFICE

MAX BOCKMÜHL, GUSTAV EHRHART, AND LEONHARD STEIN, OF FRANKFORT-ON-THE-MAIN, GERMANY, ASSIGNORS TO WINTHROP CHEMICAL COMPANY, INC., OF NEW YORK, N. Y., A CORPORATION OF NEW YORK

PROCESS OF PREPARING COMPOUNDS OF THE 1-PHENYL-2-AMINO-ALCOHOLS-1 SERIES HYDROXYLATED IN THE PHENYL RADICAL

No Drawing. Application filed June 2, 1931, Serial No. 541,738, and in Germany June 13, 1930.

The present invention relates to a process of preparing compounds of the 1-phenyl-2-aminoalcohols-1 series hydroxylated in the phenyl radical.

We have found that compounds of the 1-phenyl-2-aminoalcohols-1 series hydroxylated in the phenyl radical of the following general formula

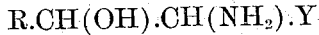

wherein R stands for a phenyl radical substituted by at least one hydroxy group and Y for an alkyl group, are obtainable by causing hydroxylamine to act upon a compound of the following general formula

wherein R stands for a phenyl radical substituted by at least one substituent of the group comprising hydroxy, alkoxy, aralkoxy and acyloxy, and Y for an alkyl group, and subjecting the oxime thus obtained to a reduction process.

The introduction of the oxime group is preferably carried out in the presence of a diluent, for instance, by dissolving the aliphatic-aromatic ketone, in which the hydroxy groups of the phenyl radical may be esterified or etherified, in an organic solvent, as for instance alcohol.

The reduction of the oximes is preferably effected by a catalytic reduction process to which the compounds are subjected in the form of their salts or as free bases, preferably dissolved in an organic solvent, such as for instance alcohol. As catalysts may be used precious metal catalysts or other metal catalysts, for instance those of the iron group. The acyl, alkyl or aralkyl radicals by which the compounds may be substituted in the hydroxy groups of the phenyl nucleus, may be split off after the introduction of the oxime group at any stage of the process, for instance, acyl radicals may be split off before the reduction of the oxime, by heating with a mineral acid, for instance hydrochloric acid; aralkyl radicals may be split off by reduction simultaneously with or after the reduction of the oxime group.

The 1-phenyl-2-aminoalcohols-1 hydroxylated in the phenyl radical as obtained according to this process are valuable therapeutics and can be utilized as remedies for treating diseases of the circulation of blood.

The following examples serve to illustrate the invention, but they are not intended to limit it thereto.

(1) 100 grams of meta-benzyloxybenzaldehyde are shaken for about 2 hours with 500 cc. of sodium bisulfite solution. The bisulfite compound formed is filtered by suction and washed with alcohol and ether. 155 grams of the bisulfite compound so obtained are then mixed with a solution of 35 grams of potassium cyanide in 350 cc. of water. The nitrile which then separates in the form of an oil is taken up with ether and dried by means of sodium sulfate. After distillation of the ether an oil is obtained which, after a short time, solidifies to a crystalline mass.

50 grams of meta-benzyloxybenzaldehyde-cyanhydrin are dissolved in 250 cc. of ether and gradually mixed, while well cooling, with the calculated quantity of methyl magnesium iodide in ether. The reaction product is then mixed with ice and the ether solution is separated. After drying by means of sodium sulfate and distilling off the ether, the keto-alcohol is obtained in the form of a yellowish oil.

20 grams of the keto-alcohol obtained are mixed in absolute alcohol with the calculated quantity of hydroxylaminehydrochloride. After standing for several hours, the oxime obtained is isolated and hydrogenated in an alcoholic-hydrochloric acid solution with hydrogen in presence of a palladium catalyst. The catalyst is separated by filtering by suction and the alcohol removed from the filtrate by distillation meta - hydroxyphenylpropanolaminehydrochloride is obtained which, after recrystallization from propyl alcohol and ether, melts at 180° C. with decomposition.

(2) 20 grams of meta-benzyloxyphenylacetylcarbinol are dissolved in alcohol and hydrogenated at room temperature with hydrogen in presence of a palladium catalyst.

As soon as 1 molecular proportion of hydrogen has been absorbed, the reduction is interrupted. The catalyst is filtered by suction and the alcohol is distilled under reduced pressure. The meta-hydroxyphenylacetylcarbinol is obtained in the form of a crystalline mass which is sufficiently pure for transformation into the oxime in the manner indicated in Example 1. By reducing the oxime as indicated in Example 1, the meta-hydroxyphenylpropanolaminehydrochloride is obtained.

(3) 20 grams of the oxime of meta-benzyloxyphenylacetylcarbinol are dissolved in 250 cc. of alcohol and hydrogenated at 80° C. with hydrogen under a pressure of 40 atmospheres in the presence of a nickel catalyst. After the catalyst has been filtered by suction, a palladium catalyst is added and the hydrogenation is continued at ordinary temperature and without applying a pressure until no further hydrogen is absorbed. The catalyst is separated by filtering by suction and the alcohol is distilled under reduced pressure, and the residue is taken up in water. The whole is extracted several times with ether and the aqueous part is then neutralized with dilute hydrochloric acid. On evaporation there is obtained the meta-hydroxyphenylpropanolaminehydrochloride which, after recrystallizing from propyl alcohol and ether, melts at 180° C. The yield amounts to 60% of the theory.

We claim:

1. The process which comprises causing hydroxylamine to act upon a compound of the following general formula

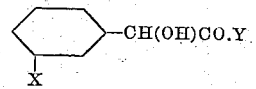

wherein X stands for an aralkoxy group and Y stands for an alkyl group, and subjecting the oxime thus obtained to a reduction process.

2. The process which comprises causing hydroxylamine to act upon a compound of the following general formula

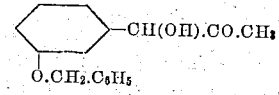

and subjecting the oxime thus obtained to a reduction process by means of hydrogen in the presence of a catalyst.

3. The process which comprises causing hydroxylamine to act upon a compound of the following general formula

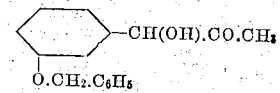

and subjecting the oxime thus obtained to a reduction process by means of hydrogen in the presence of a palladium catalyst.

In testimony whereof, we affix our signatures.

MAX BOCKMÜHL.
GUSTAV EHRHART.
LEONHARD STEIN.